(12) United States Patent
Verma

(10) Patent No.: US 11,824,734 B2
(45) Date of Patent: Nov. 21, 2023

(54) SYSTEM PROVIDING MANAGEMENT OF SERVICES AND A METHOD THEREOF

(71) Applicant: HCL AMERICA INC., Sunnyvale, CA (US)

(72) Inventor: Prafull Verma, Sunnyvale, CA (US)

(73) Assignee: HCL AMERICA INC., Sunnyvale, CA (US)

(*) Notice: Subject to any disclaimer, the term of this patent is extended or adjusted under 35 U.S.C. 154(b) by 589 days.

(21) Appl. No.: 17/001,373

(22) Filed: Aug. 24, 2020

(65) Prior Publication Data

US 2022/0060395 A1 Feb. 24, 2022

(51) Int. Cl.
*H04L 41/5041* (2022.01)
*G06F 16/28* (2019.01)
*H04L 41/0803* (2022.01)

(52) U.S. Cl.
CPC ........ *H04L 41/5041* (2013.01); *G06F 16/282* (2019.01); *H04L 41/0803* (2013.01)

(58) Field of Classification Search
CPC ........................ H04L 41/5041; H04L 41/0803; G06F 16/282
USPC ........................................................ 709/223
See application file for complete search history.

(56) References Cited

U.S. PATENT DOCUMENTS

| | | |
|---|---|---|
| 9,843,487 B2 | 12/2017 | Mordani et al. |
| 9,864,616 B2 | 1/2018 | Srinivasan et al. |
| 10,257,289 B2 | 4/2019 | Africa et al. |
| 2017/0331920 A1 | 11/2017 | Iqbal et al. |
| 2018/0114153 A1* | 4/2018 | Massarenti .......... G06Q 10/067 |
| 2019/0215239 A1* | 7/2019 | Li ....................... H04L 41/0823 |
| 2019/0363934 A1* | 11/2019 | Li ....................... H04L 41/0273 |
| 2020/0169473 A1* | 5/2020 | Rimar ..................... H04L 41/22 |
| 2021/0279057 A1* | 9/2021 | Prunier ............... G06F 12/0808 |
| 2022/0029886 A1* | 1/2022 | Hameiri .............. H04L 41/0856 |
| 2022/0050675 A1* | 2/2022 | Tamir ................... G06F 21/577 |

FOREIGN PATENT DOCUMENTS

| | | |
|---|---|---|
| EP | 3411785 A1 | 12/2018 |
| WO | 2018197928 A1 | 11/2018 |

OTHER PUBLICATIONS

Shawn McCalister "How to Integrate Cloud and On-Premise Apps" Solace, Apr. 11, 2017.
Bhanu Singh "Combine Your Traditional CMDB With Unified Service Discovery For The Next Level of IT Asset Management" OpsRamp, May 25, 2018 https://blog.opsramp.com/unified-service-discovery-cmdb.
Hybrid Cloud Management—www.microfocus.com (2019).
Tal Doron "Why We Need a New Breed of Hybrid Microservices Platform"—DZone—Jun. 20, 2017.

* cited by examiner

*Primary Examiner* — Brian Whipple

(57) ABSTRACT

Disclosed is a system providing management of services. The system comprises a database configured to store details of one or more services and one or more micro-services associated with each service of the one or more services. The database is also configured to store one or more Configuration Items (CIs) facilitating operation of the one or more services in an application. The one or more micro-services are mapped with one or more CIs for facilitating the operation of the one or more services in the application.

10 Claims, 4 Drawing Sheets

SYSTEM PROVIDING MANAGEMENT OF SERVICES AND A METHOD THEREOF

CROSS-REFERENCE TO RELATED APPLICATIONS AND PRIORITY

The present application does not claim priority from any patent application.

TECHNICAL FIELD

The present disclosure in general relates to the field of enterprise service management. More particularly, the present invention relates to a system providing management of services and a method thereof.

BACKGROUND

Generally, in an IT infrastructure, enterprises maintain a Configuration Management Database (CMDB) that acts as a data warehouse in order to keep a track of Configuration Items (CIs) within the IT infrastructure. The CMDB comprises details of the one or more CIs (such as hardware and software components used in an organization's IT services) and also define relationships between the one or more CIs.

Conventionally, CIs were relevant as the IT infrastructure was static and the fundamental concept was that a service is produced by CIs. Since CI is related to another CI, we needed CMDB to understand and manage the service. Although, this system aids in tracking all relationships and dependencies at the service level effectively at one place, however, a typical hybrid enterprise landscape includes both classic IT and Cloud-based IT. In the modern world, a service is essential in a XaaS model. XaaS generally refers to delivering anything as a service. XaaS recognizes vast number of products, tools and technologies that vendors now deliver to users as a service over a network, typically the internet, rather than provide locally or on-site within an enterprise. The service is composed of micro services, and each micro service works independently. Service catalog has now come on the top of the value chain. Upon drilling down a service into constituent micro-services and further, there may be touch points with in-house infrastructure. CMDB thus, is now deep below in the value chain. Hence, there is a requirement of an integration of service level view as well as an IT infrastructural level view at one place through a single system of record, making the CMDB more service-aware. The system is required to provide a holistic picture or a complete visibility of the IT infrastructure as well as services (i.e. the services deployed, their constituent micro-services and the underlying CIs that are leveraged to make up each service/micro-service).

In addition, multiple details are required with respect to the services and the IT infrastructure. Thus, the proposed system helps to gather all the details at one place, thereby reducing extra effort on management of database.

SUMMARY

Before the present system providing management of services and a method thereof is described, it is to be understood that this application is not limited to the particular systems, and methodologies described, as there can be multiple possible embodiments which are not expressly illustrated in the present disclosure. It is also to be understood that the terminology used in the description is for the purpose of describing the particular versions or embodiments only, and is not intended to limit the scope of the present application. This summary is provided to introduce concepts related to system providing management of services. This summary is not intended to identify essential features of the claimed subject matter nor is it intended for use in determining or limiting the scope of the claimed subject matter.

In one implementation, a system providing management of services is illustrated. The system comprises of a database configured to store details of one or more services and one or more micro-services associated with each service of the one or more services. The database is also configured to store one or more Configuration Items (CIs) facilitating operation of the one or more services in an application. The one or more micro-services are mapped with the one or more CIs for facilitating the operation of the one or more services in the application.

In another implementation, a method providing management of services is illustrated. The method may comprise configuring a database, for storing details of one or more services and one or more micro-services associated with each service of the one or more services. The configuring also comprises storing one or more Configuration Items (CIs) facilitating operation of the one or more services in an application. The one or more micro-services are mapped with the one or more CIs for facilitating the operation of the one or more services in the application.

BRIEF DESCRIPTION OF DRAWINGS

The detailed description is described with reference to the accompanying figures. In the figures, the left-most digit(s) of a reference number identifies the figure in which the reference number first appears. The same numbers are used throughout the drawings to refer like features and components.

DETAILED DESCRIPTION

Figure 1:
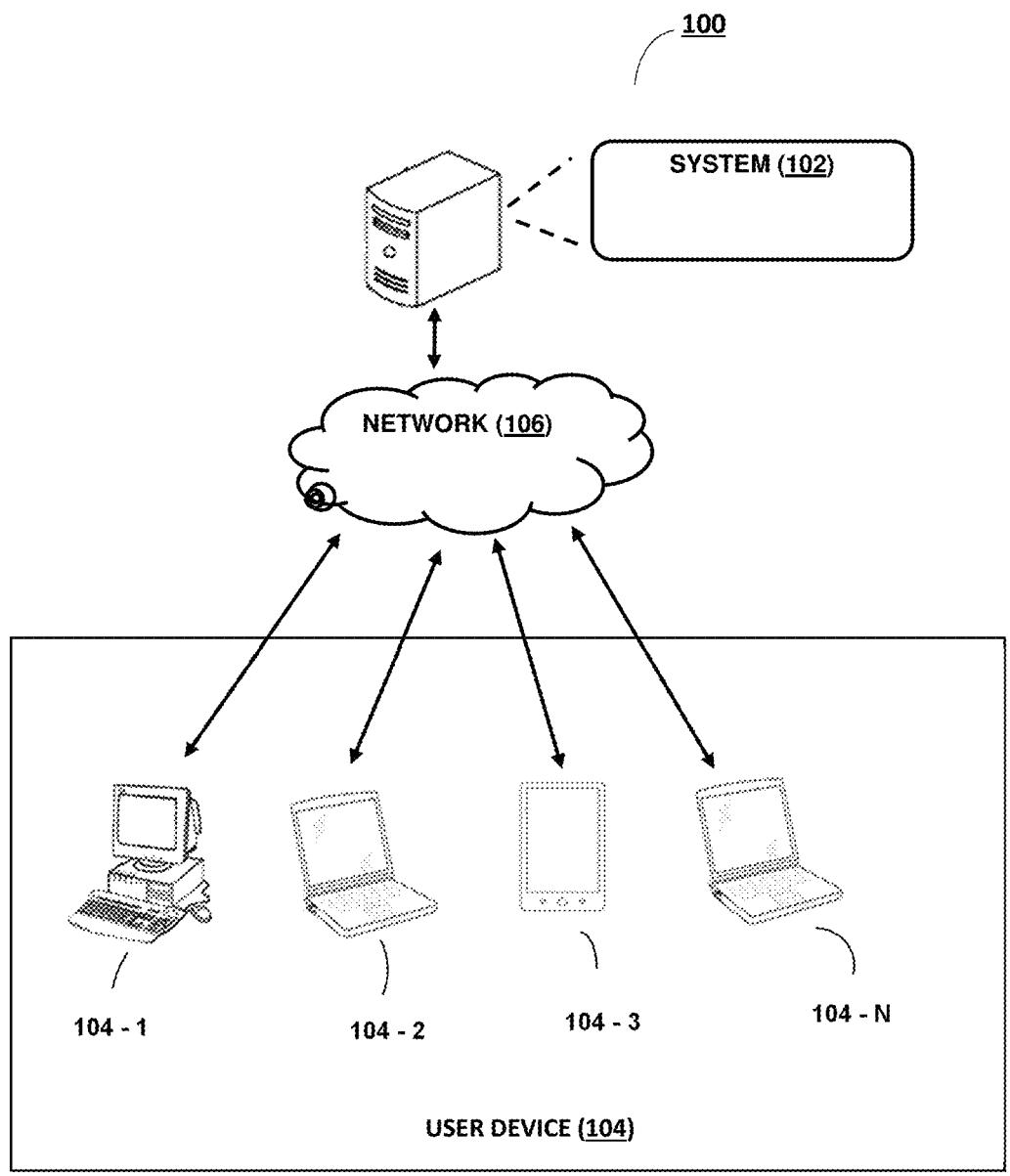
FIG. 1 illustrates a network implementation of a system 102 providing management of services, in accordance with an embodiment of the present subject matter.

Some embodiments of the present disclosure, illustrating all its features, will now be discussed in detail. The words "comprising", "receiving", and other forms thereof, are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a", "an" and "the" include plural references unless the context clearly dictates otherwise. Although any systems and methods similar or equivalent to those described herein can be used in the practice or testing of embodiments of the present disclosure, the exemplary system providing management of services and a method thereof are now described. The disclosed embodiments of the system providing management of services are merely exemplary of the disclosure, which may be embodied in various forms.

Various modifications to the embodiment will be readily apparent to those skilled in the art and the generic principles herein may be applied to other embodiments. However, one of ordinary skill in the art will readily recognize that the present disclosure for a system providing management of services is not intended to be limited to the embodiments illustrated, but is to be accorded the widest scope consistent with the principles and features described herein.

In a conventional IT infrastructure, enterprises maintained CMDB, which acted as a data warehouse in order to keep a track of Configuration Items (CIs) within the IT infrastructure. CIs were then relevant as the IT infrastructure was on-premise and static. However, a typical hybrid enterprise landscape may include classic as well as Cloud-based IT. With increasing adoption of "'As-a-Service'" model, IT infrastructure is changing dynamically. Here, CMDB may fail to provide a broader overview of one or more parent services that constitute them. Thus, the conventional systems may lack an integrated view of all services and micro-services that leverage the CIs in the CMDB. A concept of a single database for storing details of CIs, services and micro-services was thus found to be more relevant.

The present subject matter overcomes problems associated with the conventional systems. The present subject matter relates to a system providing management of services. The system may comprise a database configured to store details of one or more services and one or more micro-services associated with each service of the one or more services. The database is also configured to store one or more Configuration Items (CIs) facilitating operation of the one or more services in an application. The one or more micro-services are mapped with the one or more CIs for facilitating the operation of the one or more services in the application.

The system is configured to provide an integrated view of the one or more services, and one or more micro-services associated with the one or more services. The system is also configured to facilitate a detailed view of CIs associated with the services and the micro-services, thereby establishing relationships at each level. The relationships show the constituent micro-services and further their CIs to enable delivery of a service. Further, the present subject matter may enable a root cause analysis in case of a failure.

For example, a case may be considered, wherein a service in an IT environment is not functioning. In this case, the system may trace the micro-services of that service only and not all the micro-services that may exist in the IT environment. Further, drilling down in the hierarchy, the system may reach the impacted CIs for performing the root cause analysis of the failure in the functioning of the service. The system is thus relevant specifically in a micro-services architecture only.

For example, if Android users are not getting notification messages, then it indicates that the micro-service related to Android service is not functioning. In this case, the system will target towards the micro-services associated with the android service only, since the problem is being faced only by android users, unlike conventional way of scanning the entire code, and locating portions that are responsible for executing notification service for android users and then identifying the root cause of the failure. The system further reaches the constituent CIs associated with the micro-services in order to identify a possible root cause of the problem faced by the android users. The system performs the root cause analysis of the failure efficiently as all information regarding the android service, the constituent micro-services and the constituent CIs is located in a single database. Thus, the system also aids in reducing time consumption in performing root cause analysis of any failure by eliminating a requirement of searching multiple databases to identify impacted CIs and hence the root cause.

Furthermore, the present subject matter may enable integration with discovery tools to identify CI level data. The discovery tools assess the complete IT environment of an organization and automatically discover the CIs deployed in the IT environment.

In addition, since the system stores all information in a single unified database, any update in the information is executed on the single database only and further reflected in other tables that may take reference from this database for updated information. Unlike conventional systems, wherein information is stored in multiple databases, all of them would have different scopes and overlapping entries. The system thus eliminates the possibility of duplicity of data and redundant effort to update the same information in multiple tables. The system also eliminates a possibility of human error, since other tables are updated automatically. Also, the system manages all additions, deletions and updates with respect to services, micro-services, CIs and their relationships in the single database only. The present subject matter may enable easy maintenance and management of details of one or more components within an IT infrastructure under a single database by eliminating the need to update multiple databases for any change. It is to be noted that the system leads to an overall improvement in the service management through an integrated system.

Referring now to FIG. 1, a network implementation 100 of a system 102 providing management of services is disclosed. Although the present subject matter is explained considering that the system 102 is implemented on a server, it may be understood that the system 102 may also be implemented in a variety of computing systems, such as a laptop computer, a desktop computer, a notebook, a workstation, a mainframe computer, a server, a network server, and the like. In one implementation, the system 102 may be implemented over a cloud network. Further, it will be understood that the system 102 may be accessed by multiple users through one or more user devices 104-1, 104-2 . . . 104-N, collectively referred to as user device 104 hereinafter, or applications residing on the user device 104. The user device 104 may refer to an electronic device used for accessing one or more applications. Examples of the user device 104 may include, but are not limited to, a portable computer, a personal digital assistant, a handheld device, and a workstation. The user device 104 may be communicatively coupled to the system 102 through a network 106.

In one implementation, the network 106 may be a wireless network, a wired network or a combination thereof. The network 106 may be implemented as one of the different types of networks, such as intranet, local area network (LAN), wide area network (WAN), the internet, and the like. The network 106 may either be a dedicated network or a shared network. The shared network represents an association of the different types of networks that use a variety of protocols, for example, Hypertext Transfer Protocol (HTTP), Transmission Control Protocol/Internet Protocol (TCP/IP), Wireless Application Protocol (WAP), and the like, to communicate with one another. Further, the network

106 may include a variety of network devices, including routers, bridges, servers, computing devices, storage devices, and the like.

Figure 2:
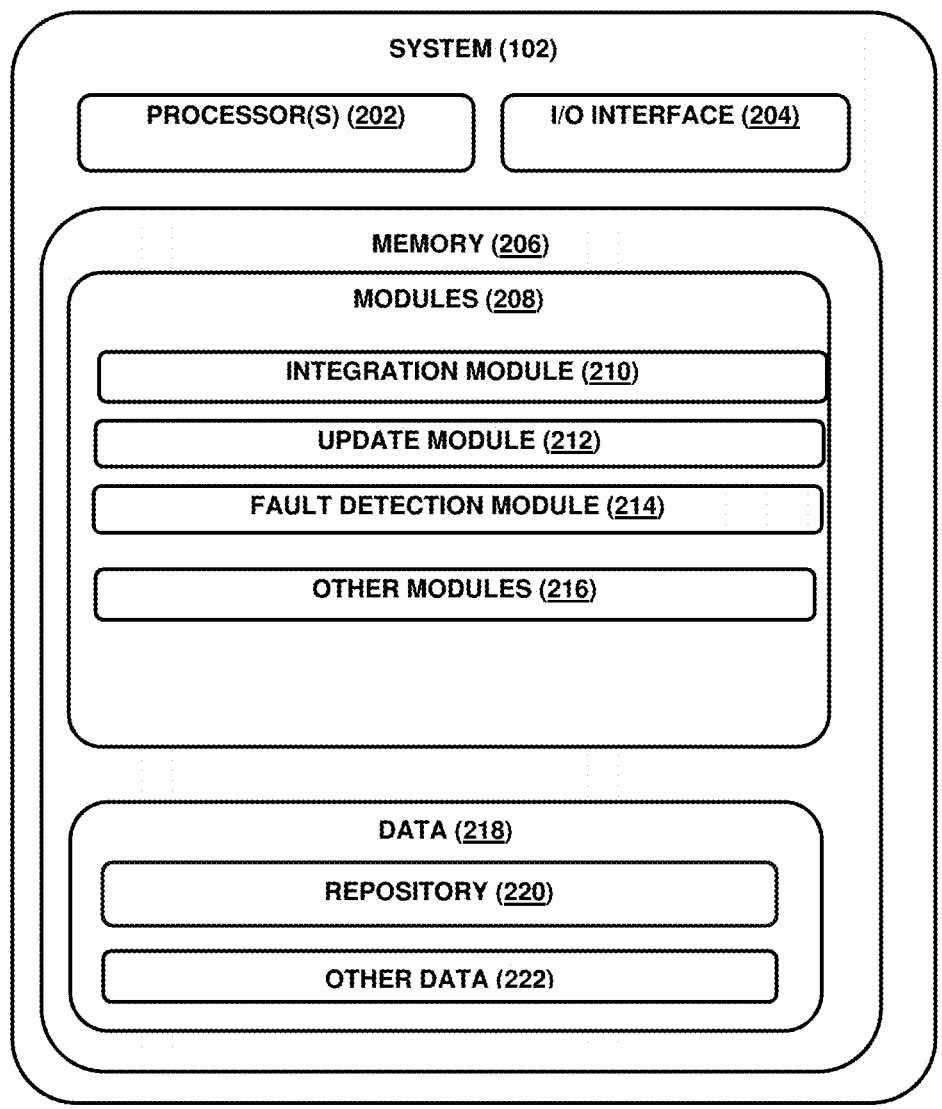
FIG. 2 illustrates a system 102 providing management of services, in accordance with an embodiment of the present subject matter.

Referring now to FIG. 2, the system 102 providing management of services is illustrated in accordance with an embodiment of the present subject matter.

In one embodiment, the system 102 may include at least one processor 202, an input/output interface 204, and a memory 206. The at least one processor 202 may be implemented as one or more microprocessors, microcomputers, microcontrollers, digital signal processors, central processing units, state machines, logic circuitries, and/or any devices that manipulate signals based on operational instructions. Among other capabilities, at least one processor 202 may be configured to fetch and execute computer-readable instructions stored in the memory 206.

The I/O interface 204 may include a variety of software and hardware interfaces, for example, a web interface, a graphical user interface, and the like. The I/O interface 204 may allow the system 102 to interact with the user through the user device 104. Further, the I/O interface 204 may enable the system 102 to communicate with other computing devices, such as web servers and external data servers (not shown). The I/O interface 204 may facilitate multiple communications within a wide variety of networks and protocol types, including wired networks, for example, LAN, cable, etc., and wireless networks, such as WLAN, cellular, or satellite. The I/O interface 204 may include one or more ports for connecting a number of devices to one another or to another server.

The memory 206 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. The memory 206 stores modules 208. The modules 208 comprise an integration module 210, an update module 212, a fault detection module 214 and other modules 216. The system 102 also comprise data 218 comprising repository 220 and other data 222.

In one implementation, a user may access the system 102 via the I/O interface. The user may be registered using the I/O interface 204 in order to use the system 102. In one aspect, the user may access the I/O interface 204 of the system 102 for obtaining information, providing input information or configuring the system 102.

Figure 3:
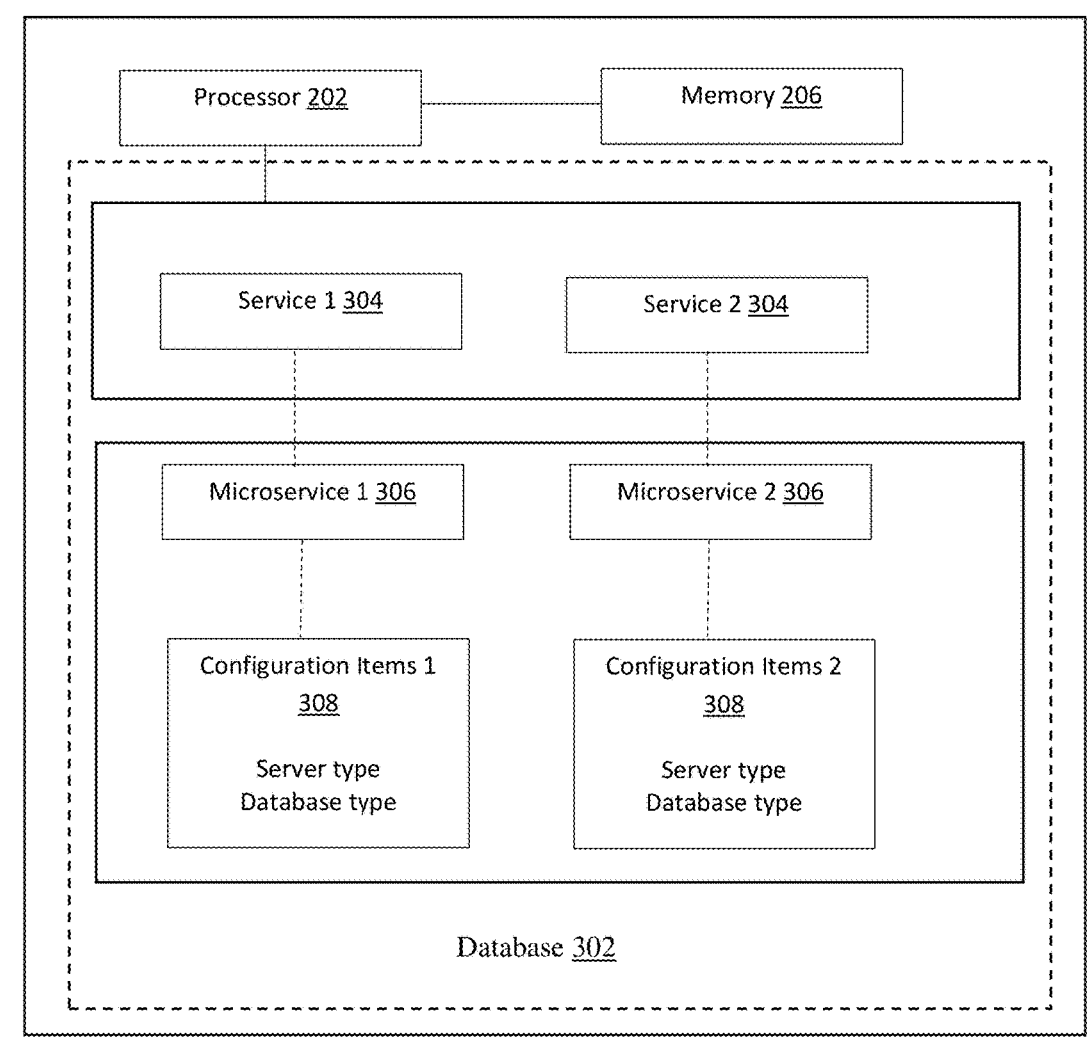
FIG. 3 illustrates an exemplary configuration of database 302 in the system 102 providing management of services, in accordance with an embodiment of the present subject matter.

In one embodiment, referring to FIG. 3, details of the system 102 providing management of services are shown. The system 102 may comprise a database 302 configured to store details of one or more services 304 and one or more micro-services 306 associated with each service 304 of the one or more services 304. The database 302 comprises an integration of properties of the one or more services 304 and the one or more micro-services 306 built in a non-relational database (NOSQL) and one or more CIs 308. Further, the properties of the one or more services 304 may be used to configure the database 302 to store the one or more micro-services 306 in a hierarchical manner (tabular form). The hierarchical manner may indicate multiple levels of the one or more services 304 and the one or more micro-services 306 before reaching the CIs 308 level. The one or more CIs 308 may comprise at least one of details on a type of server, a type of database, a LAN, a cluster, a network device, an operating system and the like. The one or more CIs 308 may further comprise, for example, a computer system having configurable attributes, such as serial number, processor speed, and IP address. The one or more CIs 308 may further comprise, for example, a software instance installed on a computer system having configurable attributes, such as license key, patch level, and licenses available.

Furthermore, the one or more micro-services 306 may be mapped with the one or more CIs 308 for facilitating the operation of the one or more services 304 in the application.

In an example, let the service 304 comprise a notification service, which is to be delivered by an organization to users. The notification service may be facilitated through an electronic messaging service integrated to the notification service. In order to deliver the electronic messaging service, the organization may opt for a micro-services approach by creating a plurality of micro-services 306.

The plurality of micro-services 306 comprise an iOS (normal text messaging for iPhones), an Android (normal text messaging for Android mobiles), an Outlook Web Access (email for Office 365 users on desktop), and a Gmail (email for Gmail users). Since, each of the micro-service from the plurality of micro-services 306 are important to meet the objective of delivering electronic messaging service to the users, thus each of the micro-service 306 is mapped with the notification service.

Further, in order to run each of the micro-service 306, an interaction with email servers and databases are required thus, each of the micro-service 306 is now mapped with the corresponding CIs 308 through the integration module 210 executed by the processor 202. The corresponding CIs 308 comprise a server type such as Windows server, an email server, a type of database etc. Hence, the system 102 captures the information regarding the service 304, the constituent micro-services 306 and CIs 308 that constitute each of these micro-services 306 at one place.

The system 102 also enables an auto-update in case there is an update in any of the services 304, micro-services 306 or the CIs 308 through the update module 212. The system 102 is scanned continuously through integrations with the discovery tools and any changes in the IT infrastructure may be updated in the database 302.

Thus, in the above mentioned example, the system 102 provides a mapping of the corresponding micro-services 306 with the CIs 308 and the corresponding micro-services 306 with the services 304 through a single database 302 for facilitating operation of the services 304 in the application.

Figure 4:
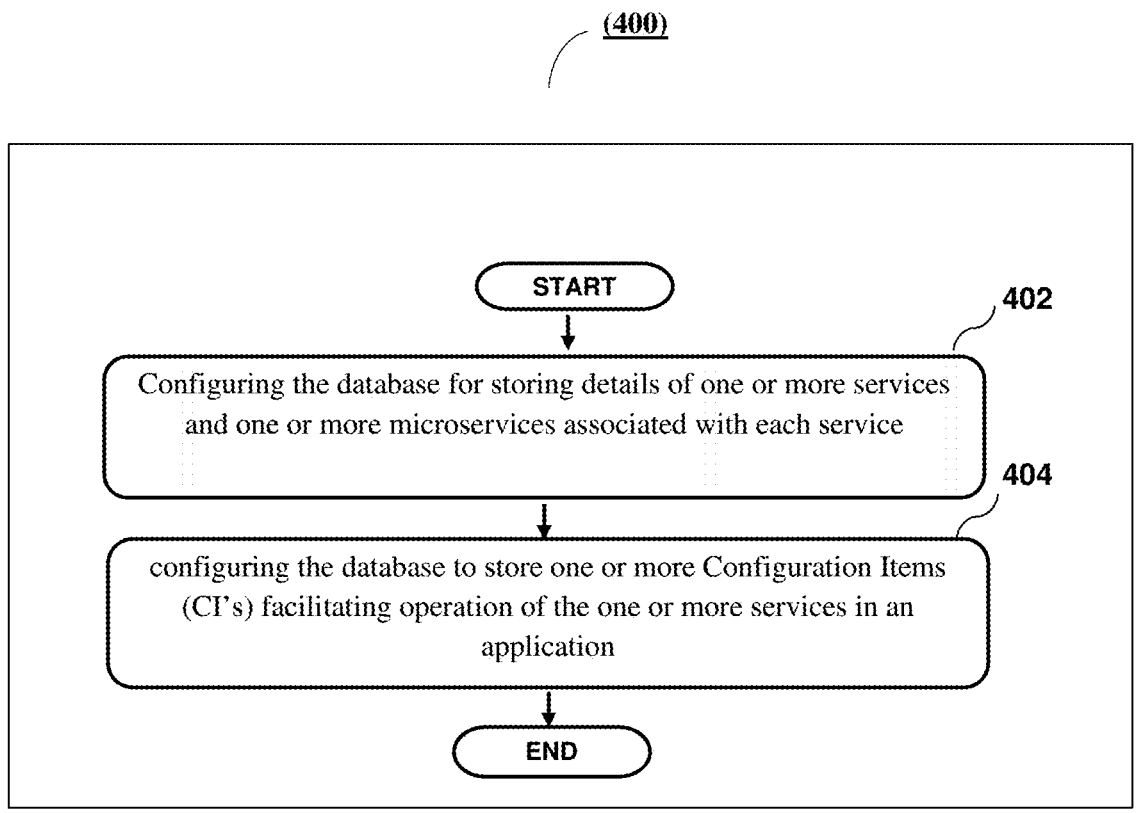
FIG. 4 illustrates a flow diagram of steps in a method 400 providing management of services, in accordance with an embodiment of the present subject matter.

Referring now to FIG. 4, a method 400 providing management of services, is disclosed in accordance with an embodiment of the present subject matter. The method 400 may be described in the general context of computer executable instructions. Generally, computer executable instructions can include routines, programs, objects, components, data structures, procedures, modules, functions, and the like, that perform particular functions or implement particular abstract data types. The method 400 may also be practiced in a distributed computing environment where functions are performed by remote processing devices that are linked through a communications network. In a distributed computing environment, computer executable instructions may be located in both local and remote computer storage media, including memory storage devices.

The order in which the method 400 is described is not intended to be construed as a limitation, and any number of the described method blocks can be combined in any order to implement the method 400 or alternate methods. Additionally, individual blocks may be deleted from the method 400 without departing from the spirit and scope of the subject matter described herein. Furthermore, the method 400 can be implemented in any suitable hardware, software, firmware, or combination thereof. However, for ease of explanation, in the embodiments described below, the method 400 may be considered to be implemented in the above described system 102 providing management of services.

At block 402, the database 302, is configured for storing the details of relationship between one or more services 304 and one or more micro-services 306 associated with each service and also for storing details of relationships between the one or more micro-services 306.

At block 404, the database 302 is configured to store one or more Configuration Items (CIs) 308 facilitating operation of the one or more services 304 in an application. The one or more micro-services 306 are mapped with one or more CIs 308 for facilitating the operation of the one or more services 304 in the application.

Exemplary embodiments discussed above may provide certain advantages. Though not required to practice aspects of the disclosure, these advantages may include those provided by the following features.

Some embodiments of the proposed system and the method may provide an integrated view of all services, and one or more micro-services constituting the services and further CIs associated with the micro-services, thereby establishing relationships at each level i.e. at service-micro-service level, at micro-service-micro-service level, and at micro-service—CI level.

Some embodiments of the proposed system and the method may enable a root cause analysis in case of a failure.

Some embodiments of the proposed system and the method may enable integration with discovery tools to identify CI level data. The discovery tools assess the complete IT environment of the organization and automatically discover the CIs deployed in the IT environment.

Some embodiments of the proposed system and the method may enable easy maintenance and management of details of all components within an IT infrastructure.

Some embodiments of the proposed system and method may enable easy on-boarding and retirement of items within a database.

Some embodiments of the proposed system and the method may reduce the chances of duplication of resources and efforts at different levels as a single database is maintaining the data regarding the IT infrastructure.

Some embodiments of the proposed system and the method may increase efficiency due to a single source of truth for business architecture by providing integration of services and micro-services in the single database.

Although implementations for the system have been described, it is to be understood that the appended claims are not necessarily limited to the specific features or methods described. Rather, the specific features and methods are disclosed as examples of implementations for a system providing management of services.

The invention claimed is:

1. A system providing management of services, comprising:
   a processor; and
   a memory communicatively coupled with the processor, wherein the memory stores processor-executable instructions, which, on execution, cause the processor to:
      configure a database to store details of one or more services and one or more micro-services associated with each service of the one or more services,
      wherein the database is configured to store one or more micro-services in a tabular hierarchical manner indicating a plurality of levels of the one or more services and the one or more micro-services associated with each service of the one or more services and one or more Configuration Items (CIs) facilitating operation of the one or more services in an application, and
      wherein the one or more micro-services are mapped with the one or more CIs for facilitating the operation of the one or more services in the application.

2. The system as claimed in claim 1, wherein the database is an integration of properties of each of the one or more services and the one or more micro-services built in a non-relational database (NOSQL), and properties of the one or more CIs.

3. The system as claimed in claim 1, wherein the one or more CIs comprise at least one of details on a type of server, a type of database, a LAN, a cluster, a network device, an operating system.

4. The system as claimed in claim 1, wherein the one or more services comprise at least one of IT based services and cloud services.

5. The system as claimed in claim 1, wherein the system is configured to:
   update, in the database, one or more changes with regard to each of the services and the one or more micro-services associated with the one or more services.

6. A method providing management of services, the method comprising:
   configuring, by a processor, a database, for storing details of one or more services and one or more micro-services associated with each service of the one or more services,
   wherein the database is configured to store one or more micro-services in a tabular hierarchical manner indicating a plurality of levels of the one or more services and the one or more micro-services associated with each service of the one or more services and one or more Configuration Items (CIs) facilitating operation of the one or more services in an application, and
   wherein the one or more micro-services are mapped with the one or more CIs for facilitating the operation of the one or more services in the application.

7. The method as claimed in claim 6, wherein the configuring comprising:
   integrating, in the database, properties of each of the one or more services and the one or more micro-services built in a non-relational database (NOSQL), and properties of the one or more CIs.

8. The method as claimed in claim 6, wherein the one or more CIs comprise at least one of details on a type of server, a type of database, a LAN, a cluster, a network device, an operating system.

9. The method as claimed in claim 6, wherein the one or more services comprise at least one of IT based services and cloud services.

10. The method as claimed in claim 6, wherein the configuring comprises:
    updating, in the database, one or more changes with regard to each of the services and the one or more micro-services associated with the one or more services.

* * * * *